United States Patent [19]
Watanabe

[11] Patent Number: 5,551,072
[45] Date of Patent: Aug. 27, 1996

[54] RECEPTION FIELD DETECTION APPARATUS

[75] Inventor: Nozomu Watanabe, Tokyo, Japan

[73] Assignee: NEC Corporation, Tokyo, Japan

[21] Appl. No.: 378,367

[22] Filed: Jan. 25, 1995

[30] Foreign Application Priority Data

Jan. 28, 1994 [JP] Japan ................................. 6-008055

[51] Int. Cl.$^6$ ................................................ H04B 17/00
[52] U.S. Cl. ..................................... 455/226.2; 455/226.1
[58] Field of Search ............................. 455/226.1, 226.2, 455/226.3, 67.1, 226.4, 67.7; 324/72

[56] References Cited

U.S. PATENT DOCUMENTS 4,365,192  12/1982  Rankin et al. .
5,128,965   7/1992  Henriksson ............................... 375/58

FOREIGN PATENT DOCUMENTS 500362    8/1992  European Pat. Off. .
4-266223  9/1992  Japan .
4-342321  11/1992  Japan .

OTHER PUBLICATIONS

Patent Abstracts of Japan, vol. 17, No. 456 (E–1418) Aug. 20, 1993 & JP–A–5102905 (Matsushita Electric Ind. Co.) 23 Apr. 1993.

*Primary Examiner*—Reinhard J. Eisenzopf
*Assistant Examiner*—Gertrude Arthur
*Attorney, Agent, or Firm*—Foley & Lardner

[57] ABSTRACT

A reception field detection apparatus includes a field intensity detection circuit, a correction value setting circuit, an adder, and a first converter. The field intensity detector generates a first digital signal representing a value corresponding to the signal intensity of a received signal. The correction value setting circuit generates a second digital signal representing the correction value of the signal intensity of the received signal in accordance with setting. The adder adds the first digital signal from the field intensity detector to the second digital signal from the correction value setting circuit to generate a third digital signal. The first converter generates a fourth digital signal representing a corrected reception field intensity on the basis of the third digital signal from the adder.

7 Claims, 3 Drawing Sheets

| CORRECTION VALUE (dB) | SET STATE OF SWITCH 7 | CORRECTION SIGNAL S18 |
|---|---|---|
| 0 | | 0 0 0 |
| +0.5 | | 0 0 1 |
| +1.5 | | 0 1 0 |
| +1.5 | | 0 1 1 |
| −0.5 | | 1 1 1 |
| −1.0 | | 1 1 0 |
| −1.5 | | 1 0 1 |

FIG.3

RECEPTION FIELD DETECTION APPARATUS

BACKGROUND OF THE INVENTION

The present invention relates to a reception field detection apparatus for detecting the signal intensity of a reception signal in a radio frequency band and, more particularly, to a reception field detection apparatus suitably used in a mobile communication base station of a mobile telephone system or the like which receives radio signals of a plurality of channels.

In a mobile communication base station of a conventional mobile telephone system or the like, in general, radio signals transmitted from a plurality of mobile units for the respective channels are received by corresponding receivers, the signal intensity of the received radio signals are measured by reception field detection apparatuses respectively incorporated in the receivers, and the channel connection control or the like of the system is performed in accordance with the signal intensity of the received radio signal. In the base station, the radio signals of all the channels received by an antenna are supplied to a signal distributer arranged in the station, and the received radio signals are distributed to the receivers, respectively. In the base station, the radio signal intensity received by each receivers must be accurately compared with each other for the channel connection control. An appropriate point such as the input terminal of the distributer or the output terminal of the antenna is set as a reception input definition point, and a received radio signal intensity at the reception input definition point is set as the standard of the received radio signal intensity (or reception field intensity) of the receivers.

In this case, the signal distributer and the receivers are connected to each other through a signal transmission line of each channel. The losses of the signal transmission lines change depending on the lengths and channels (frequencies) of the signal transmission lines. In addition, the distribution losses at the output terminals of the signal distributer are often different from each other. Therefore, when the input terminal of the signal distributer is set as the reception input definition point, and radio signal intensity of all the channels are equal to each other at this input terminal, radio signal intensity measured at the input terminals of the receivers are often different from each other. For this reason, in the reception field detection apparatus of each receiver, a measured signal intensity must be corrected for each receiver, and the conditions of objects to be compared must coincide with each other.

In such a conventional reception field detection apparatus, differences in measured signal intensity detected at the input terminals of the receivers are corrected by a fixed value (for example, Japanese Patent Laid-Open No. 4-342321: Reception Field Detection Apparatus for Radio Transceiver, and Japanese Patent Laid-Open No. 4-266223: Radio Receiver).

In the conventional reception field detection apparatus described above, a correction value of the signal intensity for each receiver is fixed to a value adjusted at an initial state. For this reason, even when a value to be corrected being changed due to a change in mounting position of each receiver on the rack installed in the station in an operation state, deterioration of each field intensity detection circuit over time, or the like, the correction value for an accurate measurement of the signal intensity cannot be easily changed.

SUMMARY OF THE INVENTION

It is an object of the present invention to provide a reception field detection apparatus capable of easily adjusting the correction value for an accurate measurement of a reception field intensity.

It is another object of the present invention to provide a reception field detection apparatus capable of correcting an adjusted loss and an adjusted gain between a signal input definition point and a reception field detection point.

In order to achieve the above objects, according to the present invention, there is provided a reception field detection apparatus comprising field intensity detecting means for generating a first digital signal representing a value corresponding to a signal intensity of a received radio signal, correction value setting means for generating a second digital signal representing a correction value of the signal intensity of the received radio signal in accordance with setting, adding means for adding the first digital signal from the field intensity detecting means to the second digital signal from the correction value setting means to generate a third digital signal, and first converting means for a fourth digital signal representing a corrected reception field intensity on the basis of the third digital signal from the adding means.

BRIEF DESCRIPTION OF THE DRAWINGS

FIG. 3 is a view showing correction values given to a dip switch 7, the set states of the dip switch 7 corresponding to the correction values, and correction signals S18 corresponding to the correction values.

DESCRIPTION OF THE PREFERRED EMBODIMENT

The present invention will be described below with reference to the accompanying drawings.

Figure 1:
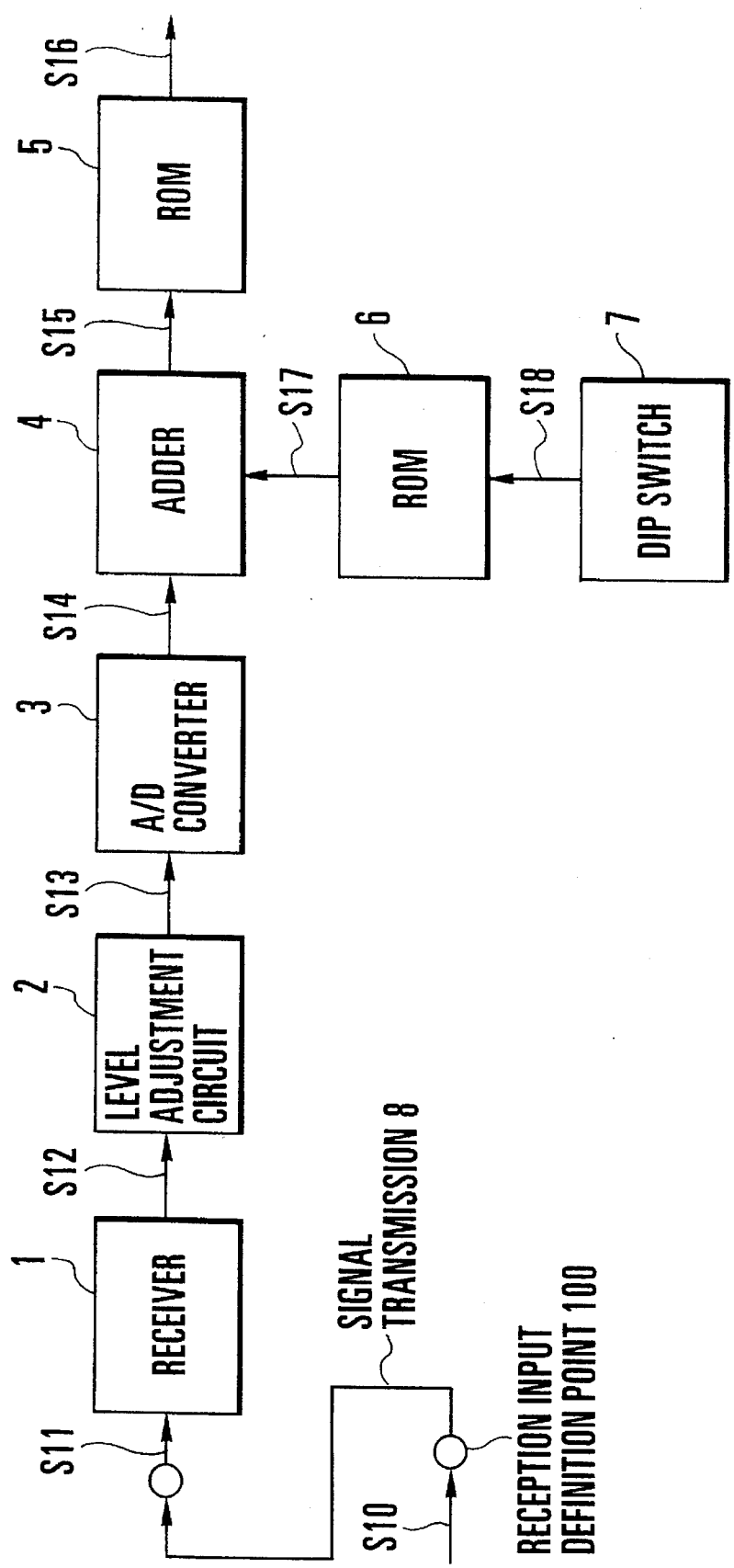
FIG. 1 is block diagram showing a reception field detection apparatus according to an embodiment of the present invention.

FIG. 1 shows a block diagram of a reception field detection apparatus according to an embodiment of the present invention.

A radio signal S10 received by an antenna (not shown) of a mobile communication base station is supplied to an input terminal of a signal distributer served as the reception input definition point 100 through a coaxial line. The radio signal S10 passes through one output terminal of the signal distributer and the coaxial line, and is supplied to a receiver 1 as a signal S11. In this case, the signal distributer and the coaxial line constitute a signal transmission line 8. The signal transmission line 8 may include an amplifier (not shown). In addition, the output terminal of the antenna may be used as the reception input definition point 100. In this case, the signal transmission line 8 includes the coaxial line between the antenna and the signal distributer.

The receiver 1 generates a reception field detection voltage S12 having a level corresponding to the signal intensity (received radio signal intensity) of the signal S11. Note that the receiver 1 may have a demodulator for the signal S11. A level adjustment circuit 2 performs level adjustment which includes output adjustment and offset adjustment to the reception field detection voltage S12, thereby generating a level adjustment signal S13. This level adjustment is performed to correct the gain of the receiver 1 to a standard value and adjust the DC potential of the reception field detection voltage S12 to the appropriate input offset value of an A/D (analog/digital) converter 3. The level adjustment is also performed to absorb variations in gain and offset between a plurality of receivers 1 used for other channels. The A/D converter 3 converts the level adjustment signal S13 into a digital signal S14.

A dip switch 7 generates a correction signal S18 serving as a digital signal corresponding to a correction value (to be described later). The correction signal S18 is used as an address signal for a ROM (Read Only Memory) 6. In the ROM 6, a table corresponding to the correction signal S18 is prepared in advance. When the ROM 6 receives the correction signal S18, the ROM 6 generates a digital signal S17 having a value corresponding to the correction signal S18.

An adder 4 adds the digital signal S14 from the A/D converter 3 to the digital signal S17 from the ROM 6 to generate a digital signal S15. This digital signal S15 is used as an address signal for a ROM 5. In the ROM 5, a table corresponding to the digital signal S15 is prepared in advance. When the ROM 5 receives the digital signal S15, the ROM 5 generates a digital signal S16 corresponding to the value of the digital signal S15. In this case, the value of the digital signal S14 from the A/D converter 3 corresponds to the signal intensity of the signal S11 at the input terminal of the receiver 1. In contrast to this, when the value of the digital signal S17 is set to be zero, the value of the digital signal S16 generated by the ROM 15 corresponds to the signal intensity of the signal S10 at the reception input definition point 100. That is, the table of the ROM 5 stores a value obtained such that a loss or gain caused by the signal transmission line 8 is fixedly corrected from the digital signal S13.

Once the above table (correction value of the loss or gain of the signal transmission line 8) of the ROM 5 is set, it is apparent that the table cannot be easily changed. When the loss of the signal transmission line 8 is changed, the dip switch 7 generates the correction signal S18 corresponding to one of a plurality of correction values which can be set to change the value of the digital signal S15 serving as the address signal for the ROM 15, thereby substantially changing the correction value of the loss of the signal transmission line 8. Therefore, the ROM 5 can generate a digital signal S16 accurately representing the reception field intensity of the signal S10 at the reception input definition point 100. Since the correction value can be easily changed by operating the dip switch 7, this changing operation can be used in correction for a change in the reception field detection voltage S12 due to deterioration of the receiver 1 over time, a change in temperature condition, or the like.

Figure 2:
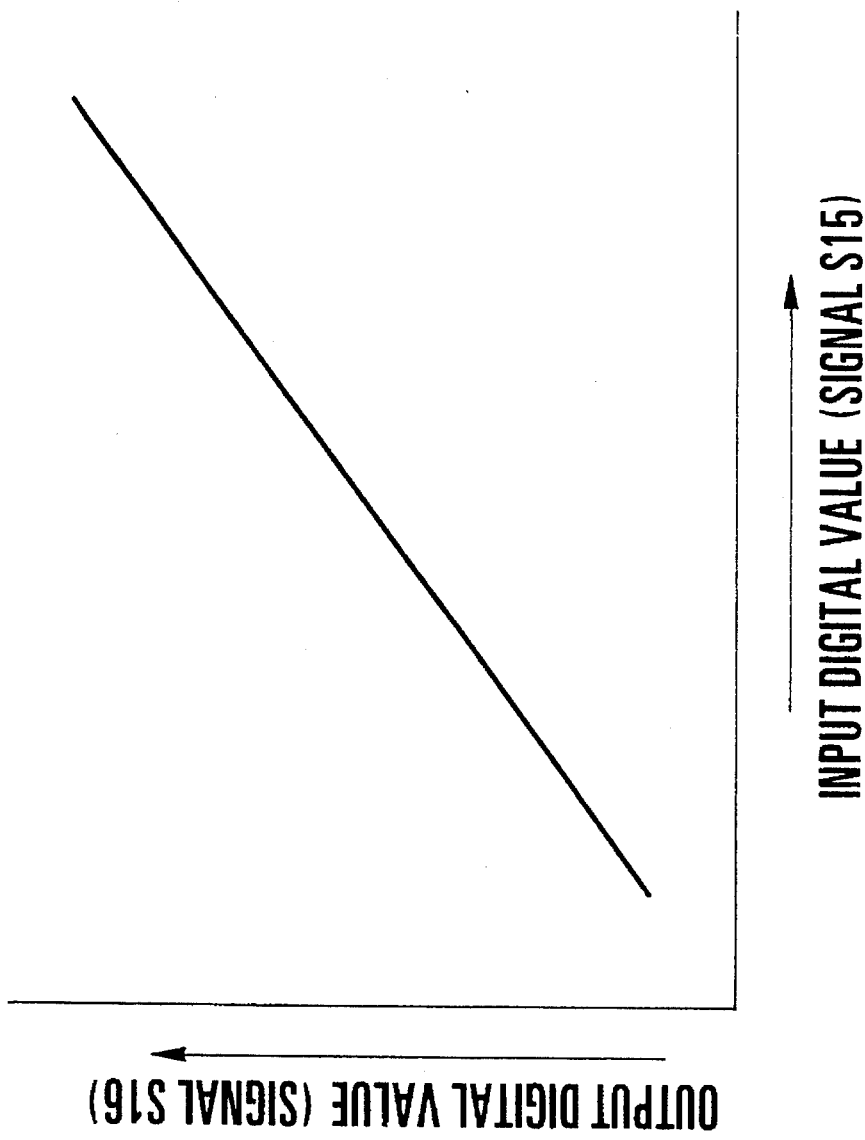
FIG. 2 is a graph showing the relationship between an input digital value (digital signal S15) and an output digital value (digital signal S16) in a ROM 5.

FIG. 2 shows the relationship between an input digital value (digital signal S15) and an output digital value (digital signal S16) in the ROM 5, i.e., a reception field intensity at the reception input definition point 100, and FIG. 3 shows correction values given to the dip switch of this embodiment, the set states of the dip switch 7 which correspond to the correction values, and the correction signals S18 which correspond to the correction values.

The operation of this embodiment will be described below in detail with reference to FIGS. 1, 2, and 3.

As shown in FIG. 2, the ROM 5 stores data, i.e., an output digital value (digital signal S16) corresponding to an input digital value (digital signal S15) and a signal intensity (reception field intensity) at the reception input definition point 100. In the initial adjustment of the field intensity detection circuit, the magnitude and offset of the reception field detection voltage S12 are adjusted by the level adjustment circuit 2 in advance such that the reception field detection voltage S12 coincides with the data in FIG. 2 in a state wherein the digital signal S17 is not added by the adder 4. This level adjustment is performed, assuming that the signal transmission line 8 has a predetermined gain or loss. More specifically, when the loss of the signal transmission line 8 is 4 dB, and a radio signal having a signal intensity of −104 dBm is input to the input terminal of the receiver 1, the value of the digital signal S16 is set to represent the signal intensity of −100 dBm of the signal S10 at the reception input definition point 100.

The dip switch 7 is a circuit for setting a correction value for correcting a change value when the gain of the signal transmission line 8 changes from a gain obtained in the initial adjustment state. The switch 7, as shown in FIG. 3, outputs a 3-bit correction signal S18 for setting correction values from +1.5 dB to −1.5 dB stepwise every 0.5 dB. More specifically, when a correction value of +0.5 dB is required, the switch 7 is set to be "001"; when a correction value of −0.5 dB is required, the switch 7 is set to be "111"; and when no correction is required, the switch 7 is set to be "000".

In this case, the signal intensity of the signal S10 is −110 dBm or more, and the signal intensity must be detected stepwise every 0.5 dB. For this reason, the A/D converter 3 requires ten output bits. Therefore, both the adder 4 and the ROM 5 perform 10-bit signal processing. Although only three bits are required to set the correction value of the dip switch 7, the number of bits of the correction signal S18 must be equal to the number of bits of the adder 4. The ROM 6 is arranged to adjust the interface between the dip switch 7 and the adder 4 with respect to the number of bits.

More specifically, the ROM 6 converts a correction value (correction signal S18) represented by three bits into a 10-bit correction value (digital signal S17). The adder 4 generates the digital signal S15 obtained by adding the digital signal S14 having information of a received signal intensity at the input terminal of the receiver 1 to the digital signal S17 having information of a correction value. As a result, the ROM 5 generates the digital signal S16 having a value corresponding to an accurate signal intensity (reception field intensity) at the reception input definition point 100.

The practical application of the field intensity detection circuit according to this embodiment will be described below.

When this field intensity detection circuit is mounted on the rack installed in the mobile communication base station described above, a gain or loss between the reception input definition point 100 and the input terminal of the receiver 1 in an operation state does not always coincide with a value set in an adjustment state. In addition, when a plurality of field intensity detection circuits are mounted, the values of the field intensity detection circuits depend on the mounting positions thereof. For example, assume that a loss which has been estimated as +4 dB actually has a value of +3.5 dB, and that the signal intensity at the reception input definition point 100 is −100 dB. In this case, when the detected signal intensity is not corrected, the signal intensity becomes −99.5 dB. In this manner, when a reception field intensity is detected in the same condition as an initial adjustment state, a reception field intensity whose value is shifted from the value of the reception field intensity at the initial adjustment state by the value caused by an error is detected.

In this embodiment, the dip switch 7 is set such correction value that the reception field intensity is reversely shifted by the error obtained by shifting the reception field intensity from the reception field intensity at the initial adjustment state. In the above example, since the value of the digital signal S16 is increased by only 0.5 dB, the dip switch 7 is set to be "111", and the adder 4 adds a received signal intensity of 0.5 dB to the value of the digital signal S16. When the switch 7 is set as described above, the reception field detection apparatus according to this embodiment can detect a field intensity at the reception input definition point 100 without an error.

Note that, in the field intensity detection circuit according to this embodiment, the digital signal S14 from the A/D converter 3 is added to the correction value using the adder 4, the ROMs 5 and 6, and the dip switch 7 which are single constituent elements, and a reception field intensity at the reception input definition point 100 is detected. However, the above digital signal processing can also be performed by a computer circuit including a microprocessor and a ROM.

As has been described above, according to the present invention, a first digital signal serving as the information of a reception field intensity is added to a second digital signal used as the correction value of the reception field intensity to generate a third digital signal, and a fourth digital signal having a value corresponding to the third digital signal is generated by a first memory means. For this reason, even if a loss or gain between a reception input definition point and a reception field detecting means has an error with respect to a value obtained in an adjustment state, correction can be easily performed, and the reception field intensity at the reception input definition point can always be accurately detected.

What is claimed is:

1. A reception field detection apparatus comprising:

field intensity detecting means for generating a first digital signal representing a value corresponding to a signal intensity of a received signal;

correction value setting means for generating a second digital signal representing a correction value of the signal intensity of the received signal in accordance with setting;

adding means for adding the first digital signal from said field intensity detecting means to the second digital signal from said correction value setting means to generate a third digital signal; and first converting means for a fourth digital signal representing a corrected reception field intensity on the basis of the third digital signal from said adding means.

2. An apparatus according to claim 1, wherein said correction value setting means comprises setting switch means which can freely set a fifth digital signal representing a correction value of the signal intensity of the received signal, and second converting means for generating the second digital signal different from the fifth digital signal in the number of bits on the basis of the fifth digital signal from said setting switch means.

3. An apparatus according to claim 2, wherein said setting switch means comprises a dip switch, having a plurality of bits, for setting, as the fifth digital signal, bit data corresponding to a correction value having a predetermined interval, and said second converting means comprises a memory for using bit data from said dip switch as address data to read out the second digital signal which is stored in advance and has bits equal in number to bits of the first digital signal.

4. An apparatus according to claim 1, further comprising a reception input definition point for receiving a signal to supply the received signal to said field intensity detecting means through a signal transmission line, and wherein said first converting means outputs, as the signal intensity of the received signal at said reception input definition point, the fourth digital signal having a value obtained by correcting the value of the first digital signal from said field intensity detecting means by a predetermined value.

5. An apparatus according to claim 1, wherein said first converting means comprises a memory for using the first digital signal from said field intensity detecting means as an address signal to read out the fourth digital signal stored in advance.

6. An apparatus according to claim 1, wherein said field intensity detecting means comprises a receiver for generating a reception field intensity voltage corresponding to the signal intensity of the received signal, a level adjustment circuit for adjusting a level of the reception field detection voltage from said receiver, and an analog/digital converter for converting the reception field detection voltage which is subjected to level adjustment and output from said level adjustment circuit to generate the first digital signal.

7. An apparatus according to claim 1, further comprising a reception input definition point for receiving a signal to supply the received signal to said field intensity detecting means through a signal transmission line, and wherein said field intensity detecting means comprises a receiver for generating a reception field intensity voltage corresponding to the signal intensity of the signal, a level adjustment circuit for adjusting a level of the reception field detection voltage from said receiver, and an analog/digital converter for converting the reception field detection voltage which is subjected to level adjustment and output from said level adjustment circuit to generate the first digital signal, said correction value setting means comprises setting switch means which can freely set a fifth digital signal representing a correction value of the signal intensity of the received signal, and second converting means for generating the second digital signal having bits equal in number to bits of the first digital signal on the basis of the fifth digital signal from said setting switch means, and said first converting means outputs, as a signal representing the signal intensity of the signal at said reception input definition point, the fourth digital signal having a value obtained by correcting a value of the first digital signal from said field intensity detecting means by a predetermined value.

* * * * *